(12) United States Patent
Endo

(10) Patent No.: US 6,240,350 B1
(45) Date of Patent: May 29, 2001

(54) CONTROL APPARATUS FOR ELECTRIC POWER STEERING SYSTEM

(75) Inventor: Shuji Endo, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/358,699

(22) Filed: Jul. 22, 1999

(30) Foreign Application Priority Data

Jul. 24, 1998 (JP) ................................................. 10-209983

(51) Int. Cl.⁷ ........................................................ G06F 7/00
(52) U.S. Cl. ................................ 701/41; 701/42; 180/6.2; 180/204; 180/446
(58) Field of Search ........................ 701/41, 42; 180/204, 180/6.2, 400, 404, 412, 413, 443, 446; 280/734, 735

(56) References Cited

U.S. PATENT DOCUMENTS 5,481,457 * 1/1996 Yamamoto et al. .................... 701/41
5,992,556 * 11/1999 Miller .................................... 180/446

FOREIGN PATENT DOCUMENTS 2546673   8/1996  (JP) .
2568817  10/1996  (JP) .

* cited by examiner

*Primary Examiner*—William A. Cuchlinski, Jr.
*Assistant Examiner*—Yonel Beaulieu
(74) *Attorney, Agent, or Firm*—Sughrue, Mion, Zinn, Macpeak & Seas, PLLC

(57) ABSTRACT

A control apparatus for an electric power steering system ensures convergence of a yaw rate of a vehicle without discomforting a driver, thus improving steerage of the vehicle. The control apparatus controls a motor that provides a steering mechanism with a steering assist force based on a current control value. The current control value is computed from a steering assist command value, which is computed based on a steering torque generated on a steering shaft, and from a motor current value. In the control apparatus, a rate of change in the yaw rate of the vehicle is detected, based on which damping is applied on the yaw rate.

5 Claims, 10 Drawing Sheets

CONTROL APPARATUS FOR ELECTRIC POWER STEERING SYSTEM

BACKGROUND OF THE INVENTION

1. Field of the Invention

The present invention generally relates to a control apparatus for an electric power steering system in which a steering system of an automobile or a vehicle is provided with a steering assist force generated by a motor. More particularly, the invention relates to a control apparatus for an electric power steering system in which convergence of a yaw rate of a vehicle is ensured.

2. Description of the Related Art

An electric power steering system for assisting a steering system of an automobile or a vehicle by a motor torque operates in such a manner that a steering shaft or a rack shaft is assisted by a driving force of the motor through a speed reducer using a transfer mechanism, such as a gear or a belt. The known electric power steering system performs feedback control of motor current to accurately generate an assist torque (steering assist torque). The feedback control is used for adjusting voltage impressed on the motor so that the difference between a current control value and a motor current detected value decreases. In general, the adjustment of the voltage impressed on the motor is performed by adjusting a duty ratio of pulse width modulation ("PWM") control. Referring now to FIG. 1, a general structure of an electric power steering system is shown. A shaft 2 of a steering wheel 1 is connected to a tie rod 6 of a vehicle wheel through a speed reduction gear 3, universal joints 4a and 4b, and a pinion rack mechanism 5. A torque sensor 10 for detecting a steering torque of the steering wheel 1 is provided on the shaft 2. A motor 20 for assisting a steering effort of the steering wheel 1 is connected through a clutch 21 and the speed reduction gear 3 to the shaft 2. A battery 14 supplies electric power through an ignition key 11 and a relay 13 to a control unit 30 that controls the power steering system. The control unit 30 computes a steering assist command value I of an assist command based on a steering torque T detected by the torque sensor 10 and a vehicle velocity V detected by a velocity sensor 12, and controls the current to be supplied to the motor 20 based on the computed steering assist command value I. The control unit 30 performs ON/OFF control of the clutch 21. The clutch 21 is normally in an ON condition (engaged). However, the clutch 21 is in an OFF condition (disengaged) when the control unit 30 determines that the power steering system is at fault, or the power supply from the battery (voltage Vb) is cut-off by the ignition key 11 or the relay 13.

The control unit 30 consists mainly of a CPU. FIG. 2 illustrates general functions executed in the CPU by a program. For example, a phase compensator 31 does not represent a phase compensator as an independent hardware component; rather, it represents a phase compensating function executed in the CPU. The function and the operation of the control unit 30 are described below. The torque sensor 10 detects a steering torque T and inputs it to the phase compensator 31. The inputted steering torque T is phase-compensated for by the phase compensator 31 to enhance the stability of the steering system. Then the phase-compensated steering torque TA is inputted to a steering assist command value computing unit 32. The vehicle velocity V detected by the velocity sensor 12 is further inputted to the steering assist command value computing unit 32. The steering assist command value computing unit 32 determines the steering assist command value I, which is equivalent to a control target value of the current to be supplied to the motor 20, based on the inputted steering torque TA and the velocity V. Then the steering assist command value I is inputted to a subtractor 30A as well as to a differential compensator 34 of a feed-forward system for increasing a response speed. A deviation (I-i) determined by the subtractor 30A is inputted to a proportional computing unit 35 and to an integral computing unit 36. The proportional output and the integral output are both inputted to an adder 30B. The integral computing unit 36 is used for improving characteristics of a feedback system. The outputs of the differential compensator 34 and the integral computing unit 36 also are inputted to the adder 30B. As a result, all the inputs to the adder 30B add up to a current control value E. The current control value E is inputted as a motor drive signal to a motor drive circuit 37. Finally, a motor current value i of the motor 20 is detected by a motor current detecting circuit 38, which in turn is fed back through the subtractor 30A.

Now referring to FIG. 3, an example of the structure of the motor drive circuit 37 is shown. The motor drive circuit 37 includes a field-effect transistor ("FET") gate drive circuit 371 for driving each gate of FET1 to FET4 based on the current control value E from the adder 30B, an H-bridge circuit including FET1 to FET4, and a booster power supply 372 for driving a high side of FET1 and FET2. The FET1 and FET2 are switched between an ON condition and an OFF condition by a PWM signal of a duty ratio D1, which is determined based on the current control value E, thereby controlling the current Ir actually supplied to the motor 20. The FET3 and FET4 are driven by a PWM signal of a duty ratio D2, which is defined by a predetermined linear function formula (given constants a and b, D2=a·D1+b) in a region where the duty ratio D1 is of a small value. After the duty ratio D2 has reached 100%, FET3 and FET4 are switched between an ON condition and an OFF condition in accordance with a rotation direction of the motor 20, which is determined based on the sign of the PWM signal.

There are known electric power steering systems that generate a moderate response in quick steerage of a vehicle. An example of such electric power steering systems is shown in Japanese Patent Publication No.45-41246. The Japanese Patent Publication No.45-41246 describes an apparatus which includes a torsion torque sensor for detecting a torsion torque of a steering shaft when turning a vehicle. In response to the output signal of the torsion torque sensor, the apparatus controls a rotation direction and a rotation torque of an electric motor. However, the above known control apparatus for the electric motor has problems as below. When the output of the control apparatus is set at a high level, convergence of a steering wheel in hand-off steerage of the vehicle deteriorates due to inertia of the control system. In addition, when quickly steering the vehicle around a sharp curve, a driver generally feels more comfortable if there is a moderate response to the steering wheel. Nevertheless, the above known electric power steering system does not include a unit for compensating for an assist steering force (power assist) in accordance with the steering speed. Hence, when making a sharp turn around a curve having a small radius, the driver feels insecure because the steering wheel feels too light.

To solve the above problems, a motor control apparatus, such as disclosed in Japanese Patent No.2568817, is provided wherein brake is applied based on the steering angle of a steering wheel. Specifically, the motor control apparatus for an electric power steering system controls rotation direction and rotation torque of an electric motor that provides a steering mechanism with an assist steering force in accordance with a command signal based on the output signal of a torsion torque sensor for detecting a torsion torque of the steering system. The motor control apparatus includes a detector for detecting a steering angular velocity in the steering system, a steering angle phase-compensating command unit for generating a damping signal, which defines rotation torques in both the steering forward direction and the backward direction, in accordance with the steering angular velocity, and a drive control unit for controlling the rotation direction and the rotation torque of the electric motor in accordance with a command signal which is the sum of the damping signal and the command signal determined based on the torsion torque signal of the steering system.

However, the above known apparatus generates a rotation torque, in response to the steering angular velocity, in the direction opposite to the steering forward direction, and brakes a change in the steering angle, thereby leading to the following problems. Specifically, because the apparatus directly brakes change in the steering angle, there is a risk that yawing of the vehicle diverges. In addition, the yawing of the vehicle is asynchronous with the steering angle, which causes an unnatural steerage feeling for a driver. Further, because the brake is directly applied to resist the change in the steering angle, the rate of convergence responding to the effort on the steering wheel is slow, during which the vehicle moves laterally, thus resulting in a dangerous situation.

SUMMARY OF THE INVENTION

Accordingly, it is an object of the present invention to provide a control apparatus for an electric power steering system for applying brake on a yaw rate of a vehicle to ensure convergence of the yaw rate, by generating a convergence signal for converging the yaw rate based on a relation between a steering angle of the electric power steering system and the yaw rate of the vehicle, thus ensuring convergence of the yaw rate without discomforting the driver.

To this end, according to the present invention, there is provided a control apparatus for an electric power steering system for controlling a motor that provides a steering mechanism of a vehicle with a steering assist force. The control apparatus includes a first computing unit for computing a steering assist command value based on a steering torque generated on a steering shaft, a second computing unit for computing a current control value from the steering assist command value and a motor current value, a control unit for controlling the motor based on the current control value, a detecting unit for detecting a rate of change in a yaw rate of the vehicle, and a damping unit for applying damping on the yaw rate based on the rate of change.

The detecting unit may include a steering angular velocity computing unit and a yaw rate differential estimating unit.

The present invention will be more fully understood from the following description of the preferred embodiment with reference to the accompanying drawings.

DETAILED DESCRIPTION OF THE PREFERRED EMBODIMENT

Figure 1:
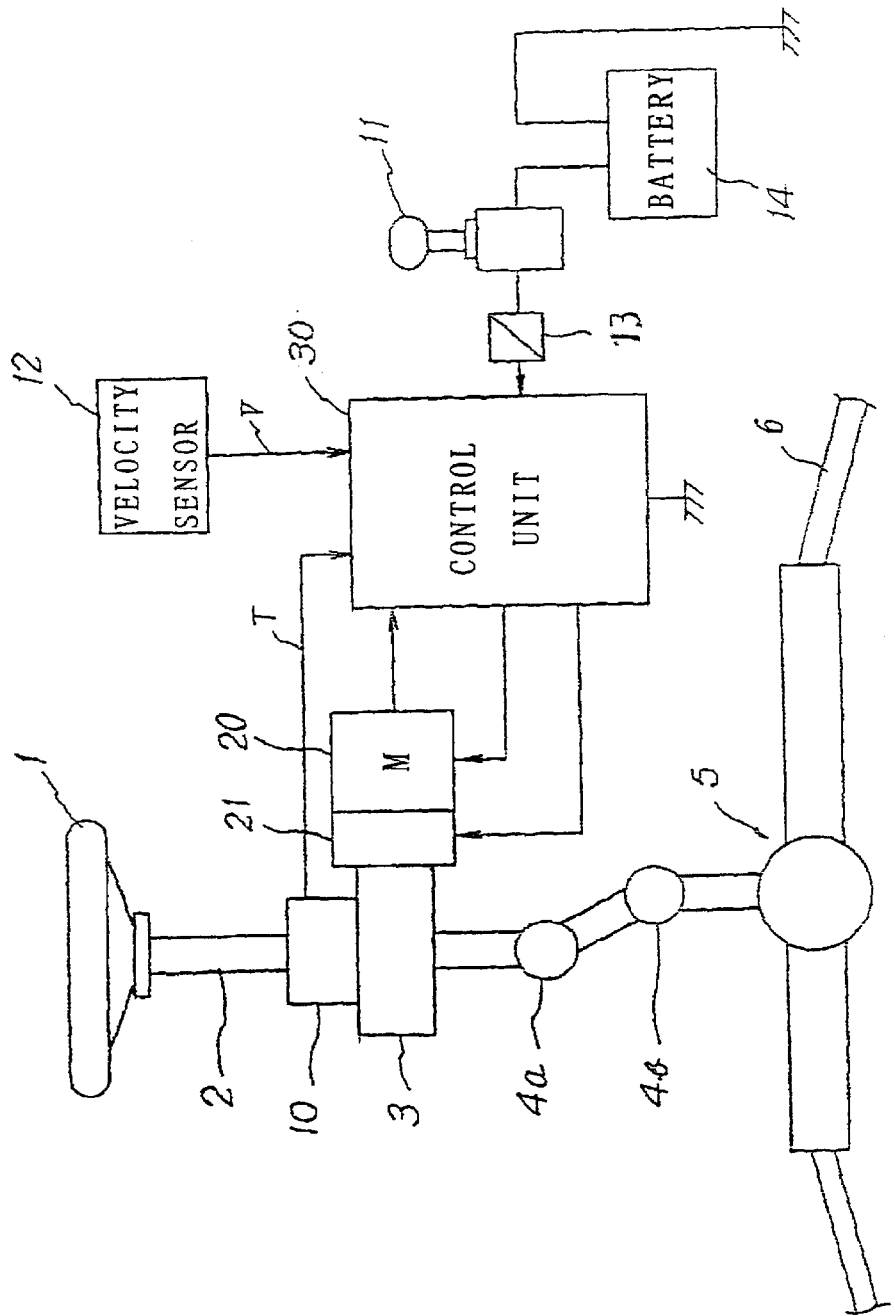
FIG. 1 is a block diagram of an example of an electric power steering system.

Generally, dynamic characteristics of an automobile can be expressed by the following expression 1 using a two-wheel model, given $\beta$ as a slip angle, $\gamma$ as a yaw rate (yaw speed), $\delta$ as an actual steering angle, and $A_{11}$ to $A_{22}$, $B_1$ and $B_2$ as constants where speed is assigned as a parameter:

$$\begin{vmatrix} \frac{d\beta}{dt} \\ \frac{d\gamma}{dt} \end{vmatrix} = \begin{vmatrix} A_{11} & A_{12} \\ A_{21} & A_{22} \end{vmatrix} \begin{vmatrix} \beta \\ \gamma \end{vmatrix} + \begin{vmatrix} B_1 \\ B_2 \end{vmatrix} \delta \qquad (1)$$

The above expression (1) is simplified using matrices A and B to expression (2):

$$\begin{vmatrix} \frac{d\beta}{dt} \\ \frac{d\gamma}{dt} \end{vmatrix} = A \begin{vmatrix} \beta \\ \gamma \end{vmatrix} + B\delta \qquad (2)$$

A self-aligning torque (Ts) which operates in a movement of a vehicle is expressed as expression (3):

$$Ts = C \begin{vmatrix} \beta \\ \gamma \end{vmatrix} + D\delta \qquad (3)$$

Using the above expressions (1) to (3), transfer characteristics in which the actual steering angle $\delta$ is the input and the self-aligning torque Ts is the output can be obtained from the following expressions 4 and 5, given I as a 2×2 unit matrix, s as a Laplace operator, and $a_1$, $a_2$, $c_0$, $b_0$, $b_1$, $c_1$, and $c_2$ as constants where speed is assigned as a parameter:

$$Ts(s) = \{C(s \cdot I - A)^{-1} \cdot B + D\} \cdot \delta(s) \qquad (4)$$
$$= \{(c_0 \cdot s^2 + c_1 \cdot s + c_2)/(s^2 + a_1 \cdot s + a_2)\} \cdot \delta(s)$$

$$\gamma(s) = \{[0\ 1](s \cdot I - A)^{-1} \cdot B\} \cdot \delta(s) \qquad (5)$$
$$= \{(b_0 \cdot s + b_1)/(s^2 + a_1 \cdot s + a_2)\} \cdot \delta(s)$$

Figure 5:
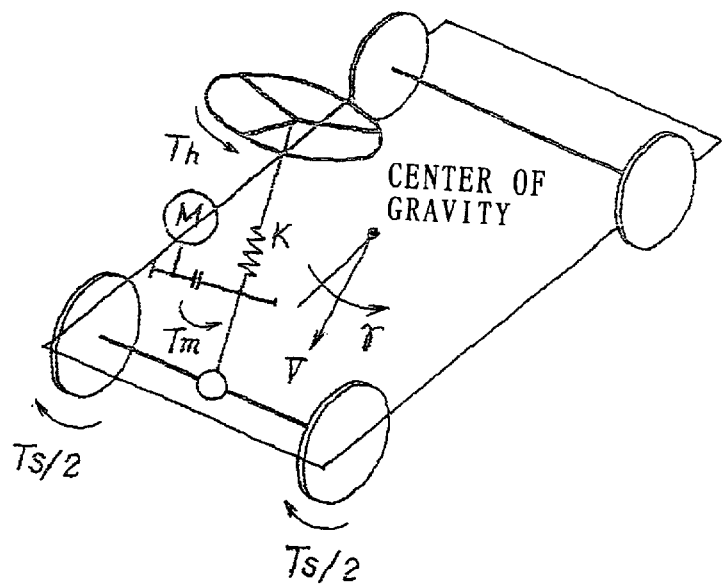
FIG. 5 is an illustration of a modeled automobile.
Figure 6:
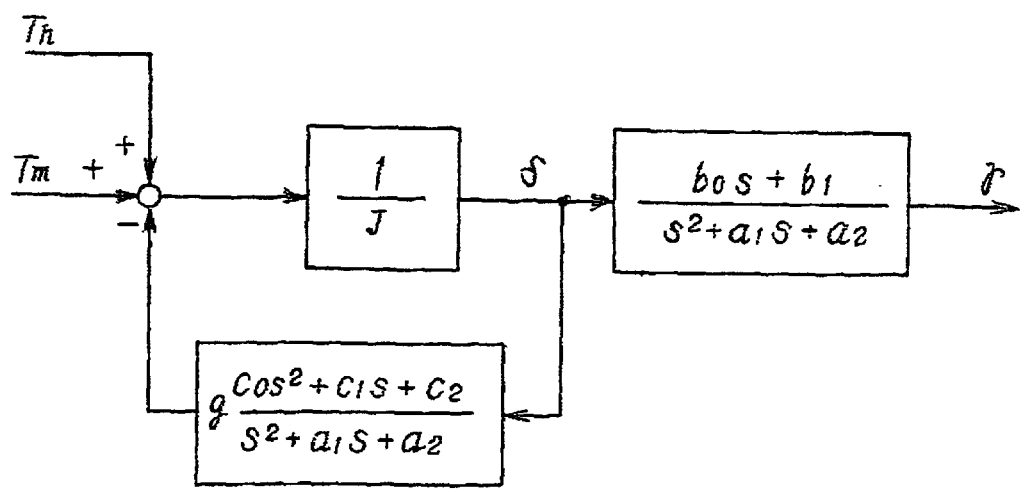
FIG. 6 is a block diagram of the model shown in FIG. 5 in a transfer function.

Referring now to FIG. 5, a vehicle model is shown. A steering effort of a driver is represented by Th and a column-shaft-reduced value of a torque generated by a motor, i.e., the motor torque i terms of the torque acting on the column shaft, by Tm. A resonance system including a torsion bar spring of the electric power steering has the natural frequency more than ten times as high as the natural frequency of γ and, hence, may simply be taken as a rigid body. Given g as a speed increasing ratio of a pinion rack, and J as a constant including handle inertia, motor inertia, and a speed reduction ratio, the model shown in FIG. 5 can be understood to have the transfer characteristics represented by blocks shown in FIG. 6. Referring now to the block diagram shown in FIG. 6, the transfer characteristics from the column-shaft-reduced value Tm to the output δ are obtained as:

$$\frac{\delta(s)}{Tm(s)} = \frac{\frac{1}{J}}{1 + \frac{g}{J} \cdot \frac{c_0 \cdot s^2 + c_1 \cdot s + c_2}{s^2 + a_1 \cdot s + a_2}} \quad (6)$$

$$= \frac{s^2 + a_1 \cdot s + a_2}{(g \cdot c_0 + J)s^2 + (g \cdot c_1 + J \cdot a_1)s + (g \cdot c_2 + J \cdot a_2)}$$

Using the above expression (6), the transfer characteristics from the column-shaft-reduced value Tm to the yaw rate γ are simplified to:

$$\frac{\gamma(s)}{Tm(s)} = \frac{s^2 + a_1 \cdot s + a_2}{(g \cdot c_0 + J)s^2 + (g \cdot c_1 + J \cdot a_1)s + (g \cdot c_2 + J \cdot a_2)} \cdot \frac{b_0 \cdot s + b_1}{s^2 + a_1 \cdot s + a_2} \quad (7)$$

$$= \frac{b_0 \cdot s + b_1}{(g \cdot c_0 + J)s^2 + (g \cdot c_1 + J \cdot a_1)s + (g \cdot c_2 + J \cdot a_2)}$$

Expression (7) demonstrates that feeding back *γ (a differential of γ) produces a damping effect on the yaw rate γ, i.e., an improved convergence of the yaw rate. Let us consider a system, such as shown in FIG. 7, which performs a predetermined feedback of the column-shaft-reduced value Tm of the motor output torque by means of a signal incorporating the yaw rate γ.

Figure 7:
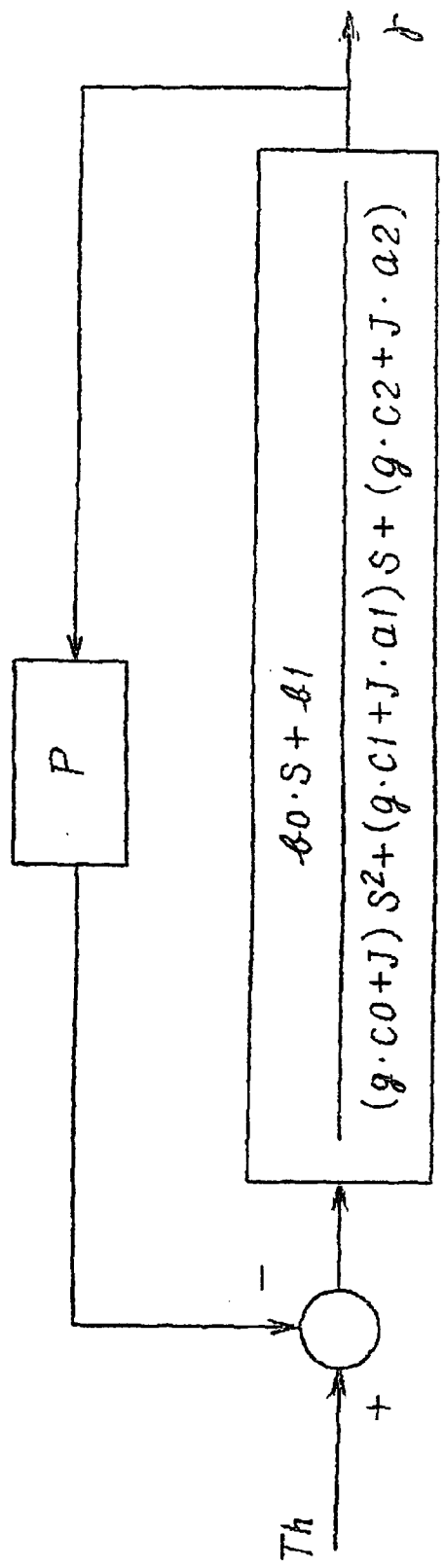
FIG. 7 is a block diagram of a feedback system of a motor torque and a yaw rate $\gamma$.

The block diagram shown in FIG. 7 leads to the following:

$$\frac{\gamma(s)}{Th(s)} = \frac{\frac{b_0 \cdot s + b_1}{(g \cdot c_0 + J)s^2 + (g \cdot c_1 + J \cdot a_1)s + (g \cdot c_2 + J \cdot a_2)}}{1 + \frac{b_0 \cdot s + b_1}{(g \cdot c_0 + J)s^2 + (g \cdot c_1 + J \cdot a_1)s + (g \cdot c_2 + J \cdot a_2)} \cdot P(s)} \quad (8)$$

Letting Kd be a feedback gain of the yaw rate γ and putting it as $P(s) = Kd \cdot s/(b_0 \cdot s + B_1)$, expression (8) can be expressed as:

$$\frac{\gamma(s)}{Th(s)} = \frac{b_0 \cdot s + b_1}{(g \cdot c_0 + J)s^2 + (g \cdot c_1 + J \cdot a_1 + Kd)s + (g \cdot c_2 + J \cdot a_2)} \quad (9)$$

The difference between expression (7), which is before feeding back the yaw rate γ, and expression (9) is an addition of the gain Kd to the second term (linear term of s) of a denominator in expression (9). Hence, damping in accordance with the feedback gain Kd of the yaw rate γ is applied on the transfer characteristics from the steering torque Th to the yaw rate γ, thereby improving the convergence of the vehicle behavior in hand-off steerage of the vehicle.

Figure 8:
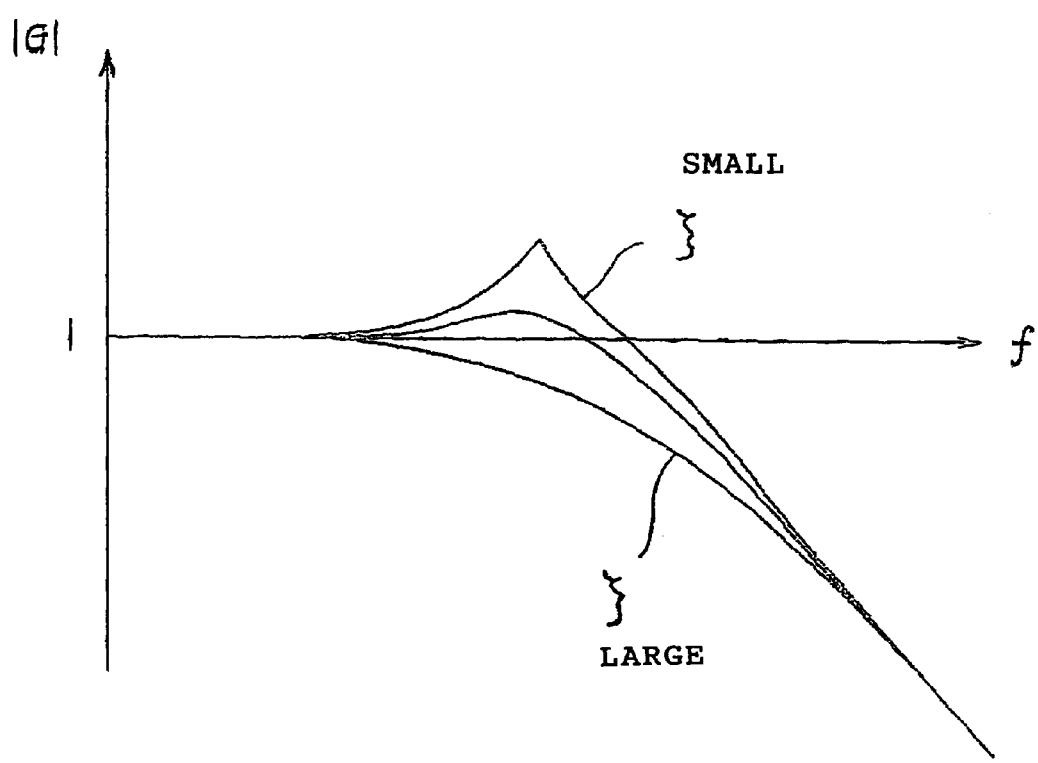
FIG. 8 is an illustration of frequency characteristics of a transfer function G(s)

It will next be described that an increase in a positive constant of the linear term of s will cause an increase in damping. The characteristics of a transfer function $G(s) = \omega^2/(c \cdot s^2 + 2\zeta \cdot \omega \cdot s + \omega^2)$ are gain 1, the natural frequency ω, and damping ζ, showing the frequency characteristics as in FIG. 8. In the transfer function, the damping ζ appears only in the linear term of s. Comparing expressions (7) and (9), the natural frequency ω is the same in the defined constant terms in denominators; the only difference is an increase in the linear term of s of the denominator in expression (9). Hence, it can be concluded that there is an increase in damping from expression (7) to expression (9). Thus, a feedback value to the motor torque is expressed as expression (10):

$$Tm(s) = \{Kd \cdot s/(b_0 \cdot s + b_1)\} \cdot \gamma(s) \quad (10)$$

$$= \{Kd/(b_0 \cdot s + b_1)\} \cdot *\gamma(s)$$

In other words, it is understood that feeding back the differential *γ(s) of the yaw rate to the column-shaft-reduced value Tm of the motor torque allows application of damping on the yaw rate γ.

Heretofore, a method for measuring the yaw rate γ to compute the differential *γ of the yaw rate and feeding it back to the column-shaft-reduced value Tm of the motor torque has been described. Now, a method for estimating *γ and feeding it back to the column-shaft-reduced value Tm of the motor torque is described below. Generally the electric power steering system either measures or estimates a motor angular velocity *θ to perform a control to compensate for the influences of motor inertia and friction. A system which outputs the yaw rate γ in response to the input of the actual steering angle δ has the transfer characteristics expressed as expression (11):

$$\gamma(s)/\delta(s) = (b_0 \cdot s + b_1)/(s^2 + a_1 \cdot s + a_2) \quad (11)$$

Assuming h is a speed reduction ratio and thus δ=h·θ(s), the following can be concluded:

$$\gamma(s) = \{(b_0 \cdot s + b_1)/(s^2 + a_1 \cdot s + a_2)\} \cdot \delta(s)$$

$$\gamma(s) = \{(b_0 \cdot s + b_1)/(s^2 + a_1 \cdot s + a_2)\} \cdot h \cdot \theta(s) \quad (12)$$

Hence, the following can be derived by differentiating the expression (12):

$$*\gamma(s) = \{(b_0 \cdot s + b_1)/(s^2 + a_1 \cdot s + a_2)\} \cdot h \cdot *\theta \quad (13)$$

Substituting an estimated value #θ(s) for the motor angular velocity *θ(s), it is possible to estimate *γ(s) using the following expression (14):

$$\#\gamma(s) = \{(b_0 \cdot s + b_1)/(s^2 + a_1 \cdot s + a_2)\} \cdot h \cdot \#\theta(s) \quad (14)$$

Here, #γ(s) is estimation of *γ(s). Hence, it is expressed as expression (15):

$$Tm(s) = \{Kd/(b_0 \cdot s + b_1)\} \cdot *\gamma(s) \quad (15)$$

$$= \{Kd/(b_0 \cdot s + b_1)\} \cdot \#\gamma(s)$$

$$= \{(b_0 \cdot s + b_1)/(s^2 + a_1 \cdot s + a_2)\} \cdot h \cdot \{Kd/(b_0 \cdot s + b_1)\} \cdot \#\theta(s)$$

$$= \{h \cdot Kd/(s^2 + a_1 \cdot s + a_2)\} \cdot \#\theta(s)$$

Using the motor angular velocity estimated value #θ to compute expression (15), the column-shaft-reduced value Tm of the motor torque is defined. It is therefore possible to achieve the same effect as that obtained through the determination of the differential *γ(s).

Figure 2:
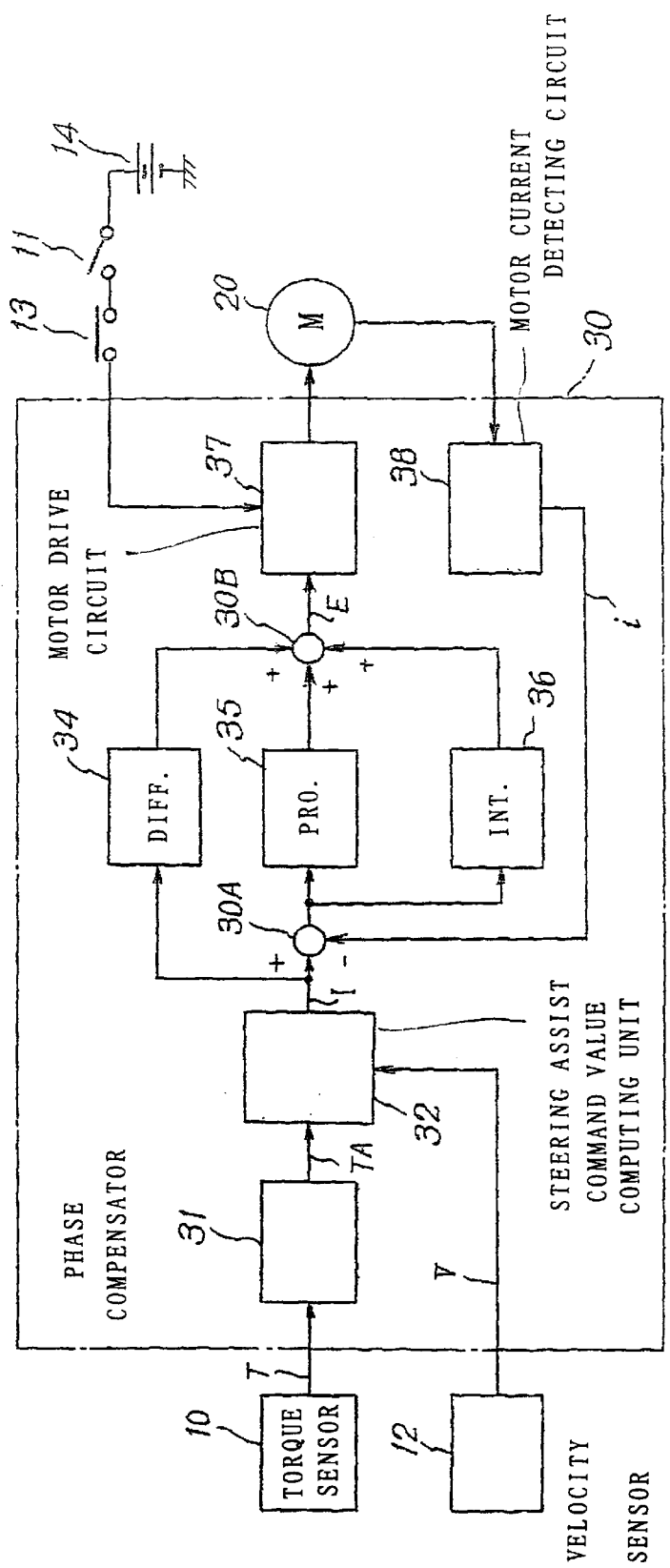
FIG. 2 is a block diagram of a general internal structure of a control unit.
Figure 3:
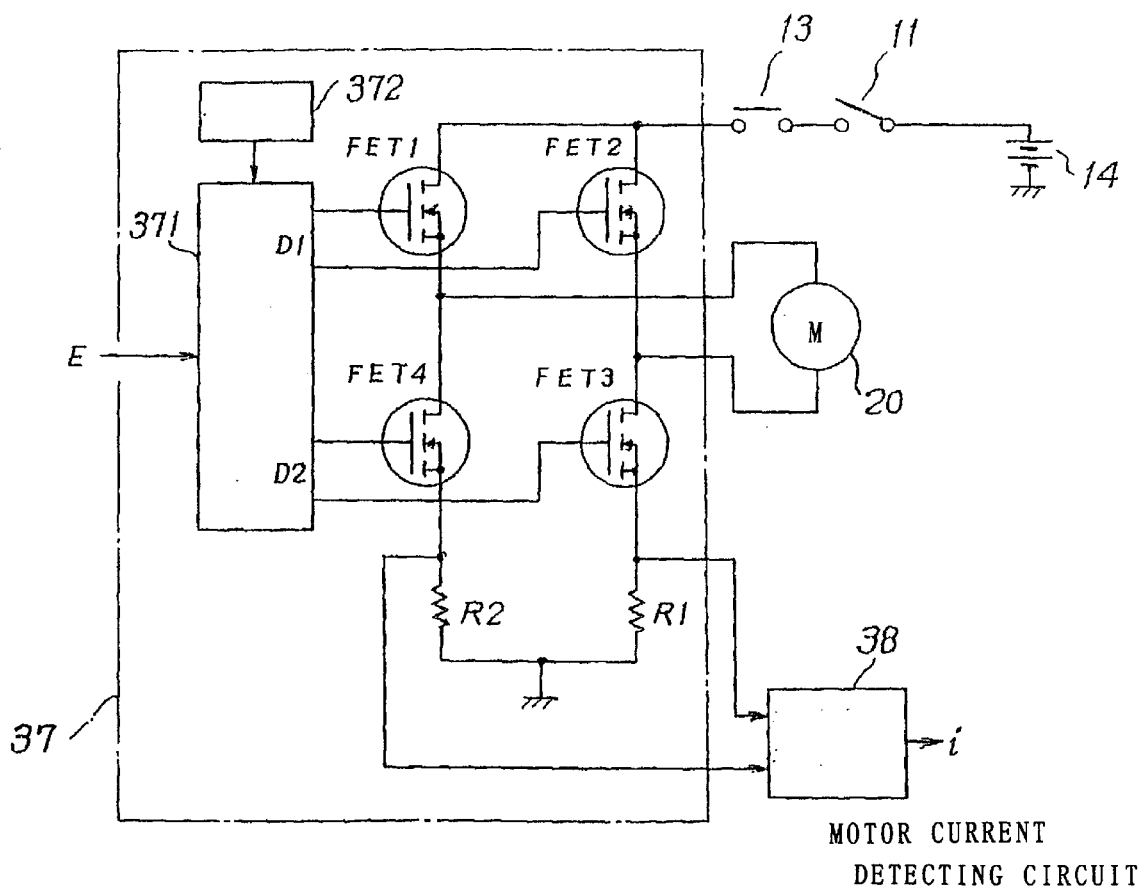
FIG. 3 is a connecting diagram of an example of a motor drive circuit.
Figure 4:
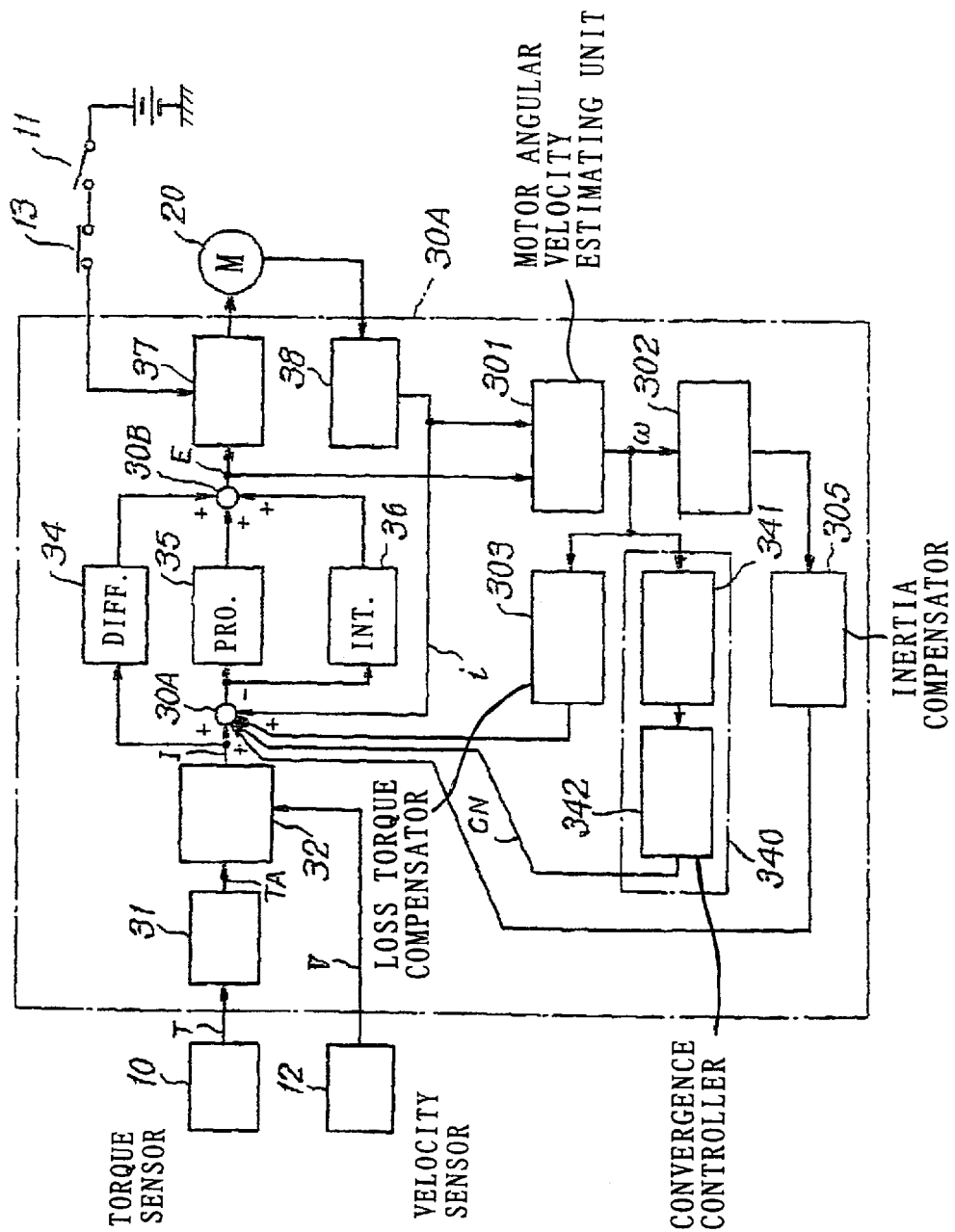
FIG. 4 is a block diagram of an example of the structure of the present invention.

Referring now to FIG. 4 corresponding to FIG. 2, an example of the structure of the present invention is illustrated. A motor angular velocity estimating unit 301 in a control unit 30A estimates a motor angular velocity ω from a current control value E (corresponding to a voltage across motor terminals) and a motor current value i. The estimated motor angular velocity ω is inputted to a loss torque compensator 303 and to a convergence controller 340. The output of the loss torque compensator 303 is inputted to an adder-subtractor 30A. The loss torque compensator 303 performs an assist to make up for a loss torque of a motor 20 in the direction where the loss torque of the motor 20 is generated, i.e. a rotation direction of the motor 20. The convergence controller 340 includes a steering angular velocity computing unit 341, which computes a steering angle θ from the motor angular velocity ω, and a yaw rate differential estimating unit 342, which outputs a convergence signal CN for converging the yaw rate based on the steering angular velocity *θ. The convergence signal CN is inputted to the adder-subtractor 30A as a feedback. In addition, the motor angular velocity ω is inputted to a motor angular acceleration estimating unit (differentiator) 302 to estimate a motor angular acceleration, which in turn is inputted to an inertia compensator 305. The inertia compensator 305 outputs a compensation signal, which is then inputted to the adder-subtractor 30A. The inertia compensator 305 is used for assisting the equivalent of a force generated by inertia of the motor 20, thereby preventing any inertia feeling or deterioration in the control response.

Firstly in the present invention, the steering angular velocity computing unit 341 computes the steering angular velocity *θ from the motor angular velocity ω. Since the motor angular velocity ω is approximately proportional to the steering angular velocity *θ, the steering angular velocity *θ is easily computed from the motor angular velocity ω. The yaw rate differential estimating unit 342 obtains a rate of change in the yaw rate γ of the vehicle from the steering angular velocity *θ. In general, a relation between the steering angle θ and the yaw rate γ is expressed as expression (16)

$$\gamma(s) = \{(b_0 \cdot s^2 + b_1 \cdot s + b_2)/(s^2 + a_1 \cdot s + a_2)\} \cdot \theta(s) \cdot b_0/(s^2 + a_1 \cdot s + a_2) \cdot \theta(s) \quad (16)$$

Both members of expression (16) are differentiated, and the following is obtained:

$$*\gamma(s) = b_0/(s^2 + a_1 \cdot s + a_2) \cdot *\theta(s) \quad (17)$$

In other words, the rate of change *γ is obtained from the steering angular velocity *θ(s) using expression (17). Here, the natural frequency of the transfer characteristics of the torque to the steering angle in a mechanical system of the steering system is about ten times as high as the natural frequency of the transfer characteristics of the steering angle to the yaw rate. Hence, the torque T is approximately proportional to the steering angle θ. Consequently, feeding back a torque signal, which is proportional to *γ(s) in expression 17, allows the generation of a steering angle signal, which is in synchronism with the rate of change in the yaw rate. As a result, damping is applied on the yaw rate. The reason for this has been described hereinabove.

$$\gamma(s) = b_0/(s^2 + a_1 \cdot s + a_2) \cdot \theta(s) T(s) = \theta(s) \quad (18)$$

Figure 9:
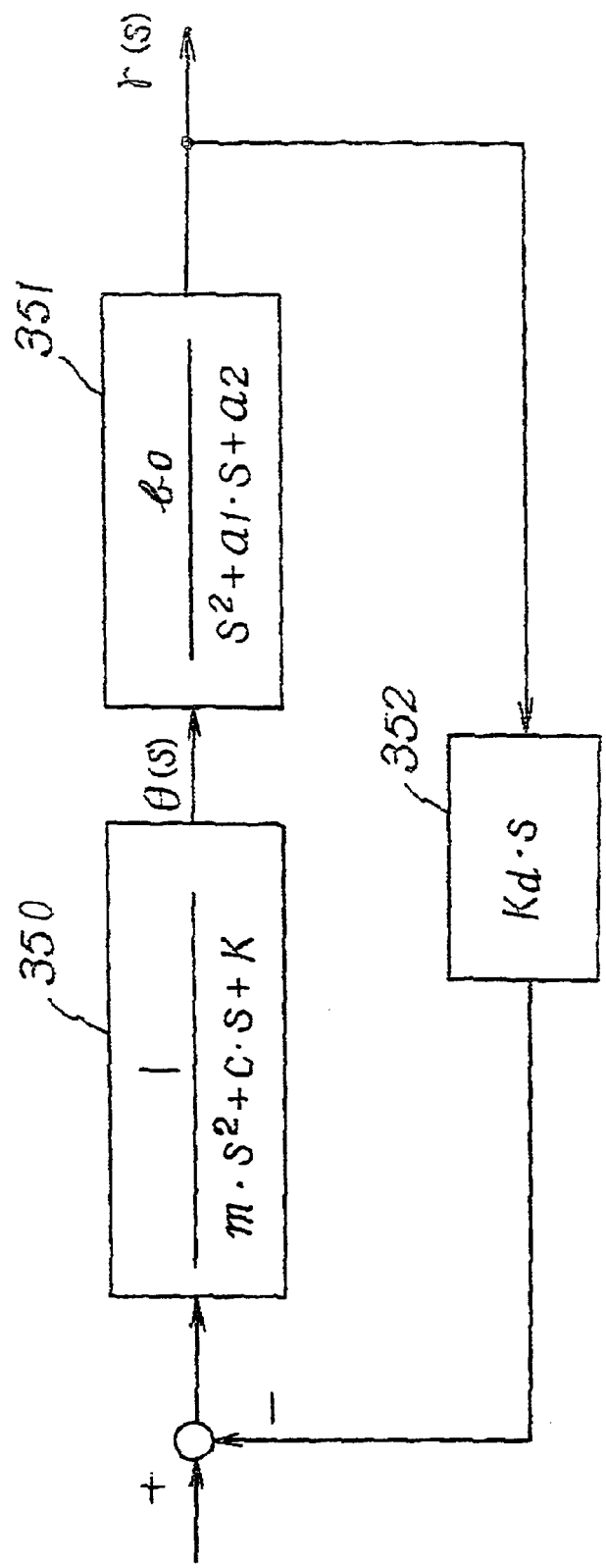
FIG. 9 is a block diagram of the structure of a convergence system according to the present invention.
Figure 10:
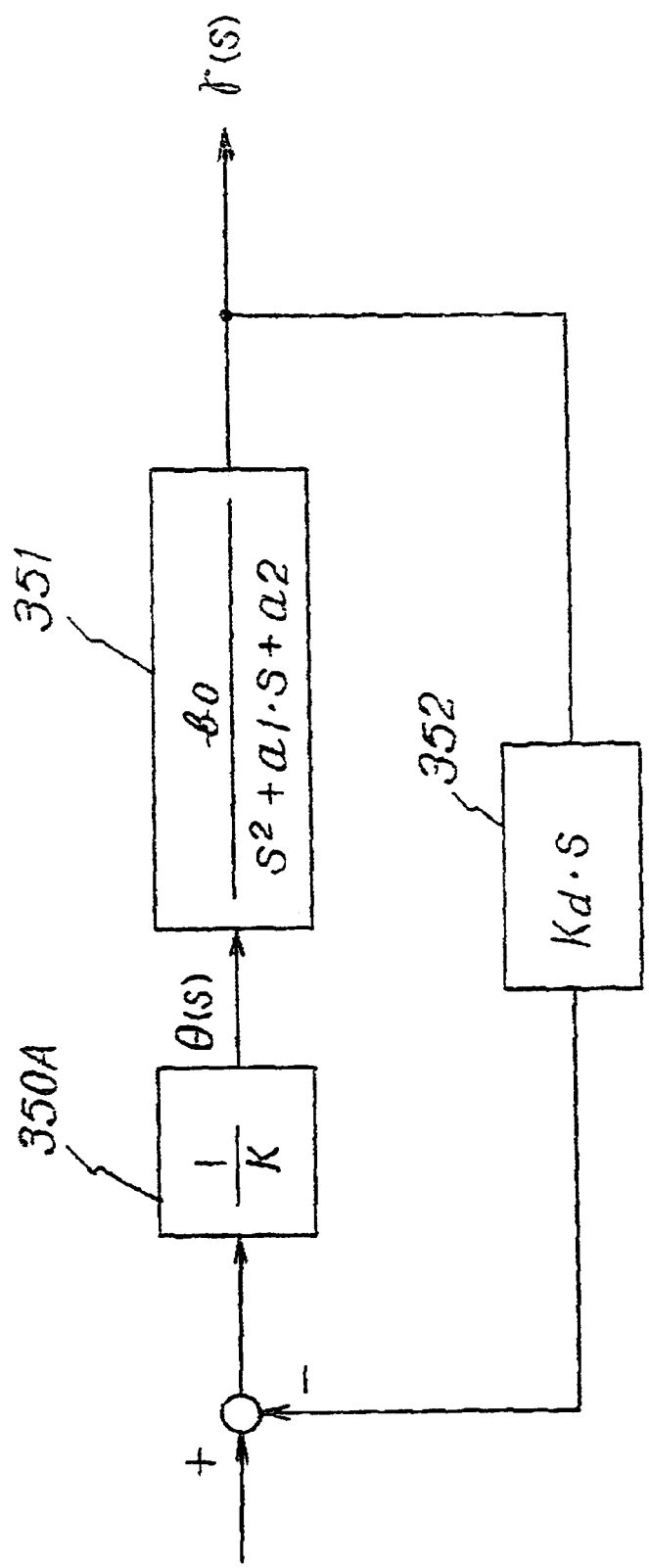
FIG. 10 is an illustration of an equivalent circuit of the structure shown in FIG. 9.

FIG. 9 illustrates a block diagram for obtaining a transfer function shown in FIG. 10, which is obtained when the constant K is greater than constants m and c, the block diagram shown in FIG. 10 is taken. Referring now to FIG. 9, block 350 shows a transfer function of the steering system, and block 351 indicates a transfer function of the vehicle. The block diagram shown in FIG. 10 is expressed as expression (19):

$$\gamma(s)/T(s) = (1/K) \cdot b_0/(s^2 + (a_1 + Kd) \cdot s + a_2) \quad (19)$$

Hence, damping is applied on the yaw rate. As indicated in expression (19), since damping ($a_1 + Kd$) which affects the natural frequency $a_2$ of the vehicle is increased, the convergence speed will not be impaired. Because variables $a_1$, $a_2$, $b_0$, and $b_1$ have speed as a parameter, it is preferable to change their values in accordance with the velocity of the vehicle.

A control apparatus according to the present invention generates a convergence signal for converging a yaw rate based on a relation between a steering angle of an electric power steering system and the yaw rate of a vehicle, so that the convergence of the yaw rate is ensured. In addition, the apparatus prevents the yaw rate under the control from becoming slower than the convergence speed of the yaw rate that is peculiar to the vehicle.

Figure 11:
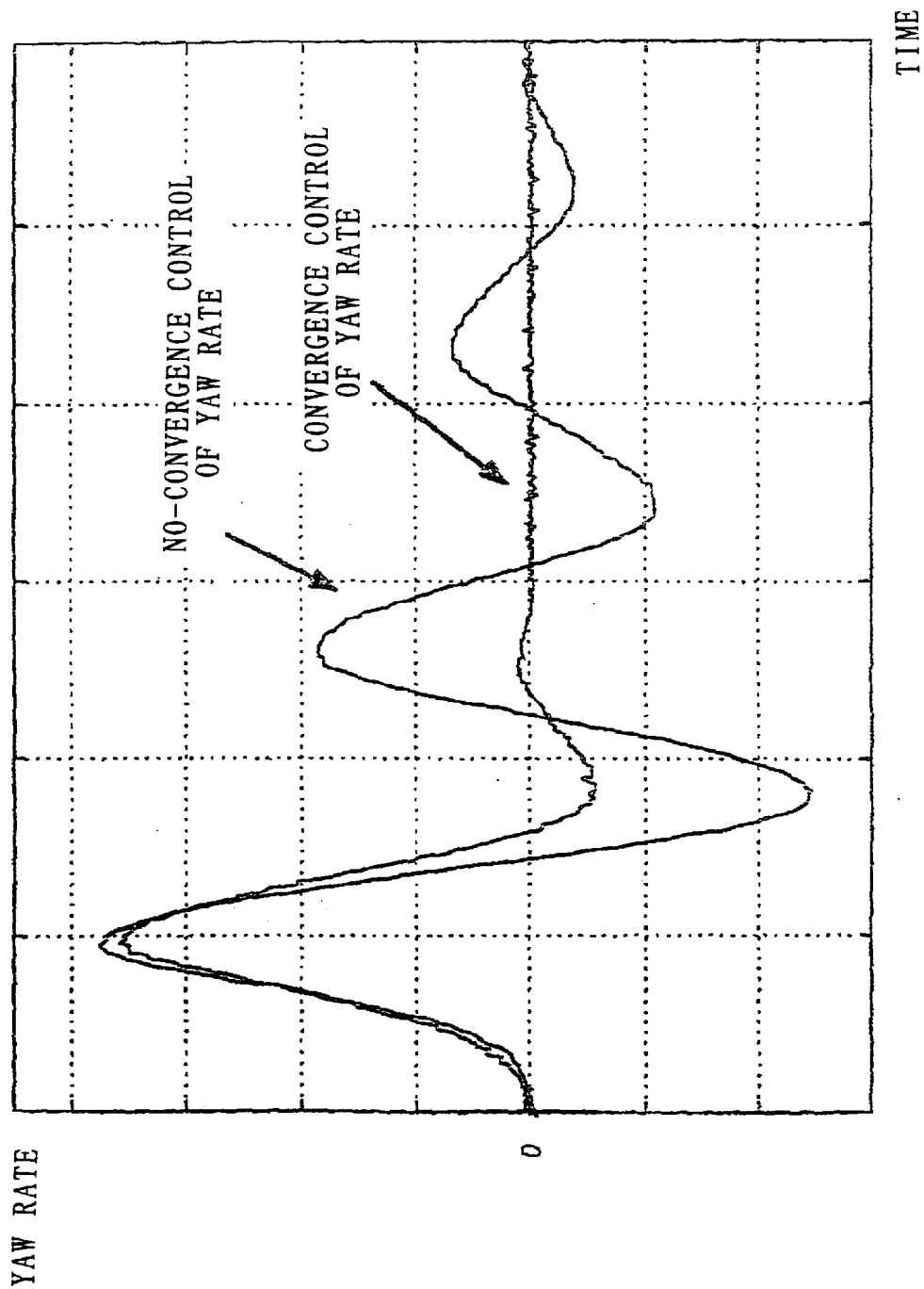
FIG. 11 is an illustration of effects of a yaw rate convergence control.

FIG. 11 illustrates an example of experimental characteristics in two cases, i.e., one case where a yaw rate convergence control has been performed and the other case where no such a control has been performed. From the experimental result, it may be understood that the present invention is highly advantageous.

What is claimed is:

1. A control apparatus for an electric power steering system for controlling a motor that provides a steering mechanism with a steering assist force, including a first computing means for computing a steering assist command value based on a steering torque generated on a steering shaft, a second computing means for computing a current control value from the steering assist command value and a motor current value and a control means for controlling the motor based on the current control value, wherein the control apparatus comprising:

a detecting means for detecting a rate of change in a yaw rate of a vehicle and a damping means for damping the yaw rate based on the rate of change in the yaw rate.

2. A control apparatus for an electric power steering system according to claim 1, wherein the detecting means includes a third computing means for computing a steering angular velocity and an estimating means for estimating a yaw rate differential.

3. A control apparatus for an electric power steering system according to claim 2, wherein an estimated value of the motor angular velocity *θ is inputted to said third computing means.

4. A control apparatus for an electric power steering system according to claim 3, wherein said estimating means carries out an equation of $$(b_0 \cdot s + b_1)/(s^2 + a_1 \cdot s + a_2) \cdot h \cdot *\theta.$$

where s denotes Laplace operator, $b_0$, $b_1$, $a_1$, $a_2$ constants and h speed reduction ratio.

5. A control apparatus for an electric power steering system according to claim 3, wherein said rate of change in the yaw rate is obtained by detection of the yaw rate and a differential of a detection signal.

\* \* \* \* \*